United States Patent
Aggarwal

(10) Patent No.: US 10,467,538 B2
(45) Date of Patent: Nov. 5, 2019

(54) LINK DE-NOISING IN A NETWORK

(71) Applicant: International Business Machines Corporation, Armonk, NY (US)

(72) Inventor: Charu C. Aggarwal, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 1069 days.

(21) Appl. No.: 14/481,274

(22) Filed: Sep. 9, 2014

(65) Prior Publication Data

US 2016/0070810 A1  Mar. 10, 2016

(51) Int. Cl.

| | | |
|---|---|---|
| G06F 17/30 | (2006.01) | |
| G06N 7/00 | (2006.01) | |
| H04L 12/24 | (2006.01) | |
| G06Q 50/00 | (2012.01) | |
| G06F 17/00 | (2019.01) | |

(52) U.S. Cl.
CPC ............ G06N 7/005 (2013.01); G06Q 50/01 (2013.01); H04L 41/12 (2013.01); H04L 41/142 (2013.01)

(58) Field of Classification Search
CPC ....... G06N 7/005; H04L 41/12; H04L 41/142; G06Q 50/01
See application file for complete search history.

(56) References Cited

U.S. PATENT DOCUMENTS

| 8,433,395 B1 | 4/2013 | Brockway et al. | |
|---|---|---|---|
| 8,453,068 B2 | 5/2013 | Stibel et al. | |
| 8,583,659 B1* | 11/2013 | Alexandrescu | G06F 16/9024 707/748 |
| 8,886,655 B1* | 11/2014 | Nandy | G06F 16/904 707/749 |
| 9,646,057 B1* | 5/2017 | Jurgens | G06F 16/24578 |
| 2006/0122998 A1* | 6/2006 | Bar-Yossef | G06F 17/30864 |
| 2008/0052378 A1* | 2/2008 | Matsuyama | H04L 41/22 709/218 |
| 2009/0006290 A1* | 1/2009 | Gunawardana | G06Q 10/04 706/14 |
| 2009/0112989 A1* | 4/2009 | Anderson | G06Q 30/02 709/204 |
| 2010/0076910 A1* | 3/2010 | Gao | G06F 16/951 706/11 |
| 2012/0102130 A1* | 4/2012 | Guyot | H04L 51/12 709/206 |

(Continued)

FOREIGN PATENT DOCUMENTS

| WO | 2013043157 A2 | 3/2013 |
|---|---|---|
| WO | 2013071144 A1 | 5/2013 |

OTHER PUBLICATIONS

Charu C. Aggarwal "Social Network Data Analytics", Springer Science+Business Media, LLC 2011.*

(Continued)

Primary Examiner — Polina G Peach
(74) Attorney, Agent, or Firm — David Zwick; Ryan, Mason & Lewis, LLP

(57) ABSTRACT

A method includes obtaining a graph representative of a given network, sampling the graph a given number of times to estimate a level of noisiness for one or more edges in the graph, and annotating the one or more edges of the graph with the respective level of noisiness.

20 Claims, 4 Drawing Sheets

(56) References Cited

U.S. PATENT DOCUMENTS

| | | | |
|---|---|---|---|
| 2012/0191633 A1* | 7/2012 | Liu | E21B 47/0007 706/12 |
| 2013/0060785 A1* | 3/2013 | Sweeney | G06N 5/00 707/748 |
| 2013/0080117 A1* | 3/2013 | Liu | G06F 17/10 702/183 |
| 2013/0117368 A1 | 5/2013 | Dozier et al. | |
| 2013/0198240 A1* | 8/2013 | Ameri-Yahia | G06Q 30/02 707/798 |
| 2014/0143332 A1* | 5/2014 | Garg | H04L 67/306 709/204 |
| 2014/0245163 A1* | 8/2014 | Mubarek | G06F 3/0484 715/738 |
| 2014/0279727 A1* | 9/2014 | Baraniuk | G06N 20/00 706/11 |
| 2014/0280232 A1* | 9/2014 | Chidlovskii | G06F 17/30038 707/749 |
| 2015/0278366 A1* | 10/2015 | Pilpel | G06F 16/9024 707/723 |
| 2015/0294218 A1* | 10/2015 | Thomson | G06F 19/12 706/15 |

OTHER PUBLICATIONS

Q.D. Morris et al., "Denoising and Untangling Graphs Using Degree Priors," Advances in Neural Information Processing Systems (NIPS), Dec. 2003, pp. 385-392, vol. 16, Vancouver and Whistler, British Columbia, Canada.

B. Huang et al., "Maximum Likelihood Graph Structure Estimation with Degree Distributions," Analyzing Graphs: Theory and Applications, NIPS Workshop, 2008, 6 pages.

A. Sadilek et al., "Modeling Success, Failure, and Intent of Multi-Agent Activities Under Severe Noise," Mobile Context Awareness, Jan. 2012, pp. 9-63.

Jeffrey Kai Chi Chan, "Discovering Regions of Correlated Change in Dynamic Graphs," The University of Melbourne, Department of Computer Science and Software Engineering, Feb. 2009, 249 pages.

James William Handley, "Time Frequency Analysis Techniques in Terahertz Pulsed Imaging," The University of Leeds, School of Computing, PhD Thesis, Dec. 2003, 166 pages.

L. Backstrom et al., "Group Formation in Large Social Networks: Membership, Growth, and Evolution," Proceedings of the 12th ACM SIGKDD International Conference on Knowledge Discovery and Data Mining, Aug. 2006, pp. 44-54.

D. Chakrabarti et al., "Evolutionary Clustering," Proceedings of the 12th ACM SIGKDD International Conference on Knowledge Discovery and Data Mining, Aug. 2006, pp. 554-560.

S. Chakrabarti et al., "Enhanced Hypertext Categorization Using Hyperlinks," Proceedings of ACM SIGMOD International Conference on Management of Data, Jun. 1998, pp. 307-318.

Y. Chi et al., "Evolutionary Spectral Clustering by Incorporating Temporal Smoothness," Proceedings of the 13th ACM SIGKDD International Conference on Knowledge Discovery and Data Mining, Aug. 2007, pp. 153-162.

A. Clauset et al., "Finding Community Structure in Very Large Networks," Physical Review E, Dec. 2004, pp. 1-6, vol. 70, No. 6.

H. Gao et al., "Network Denoising in Social Media," IEEE/ACM International Conference on Advances in Social Networks Analysis and Mining (ASONAM), Aug. 2013, pp. 564-571, Niagara Falls, Ontario, Canada.

R. Jin et al., "Discovering Highly Reliable Subgraphs in Uncertain Graphs," Proceedings of the 17th ACM SIGKDD International Conference on Knowledge Discovery and Data Mining, Aug. 2011, pp. 992-1000.

Q. Lu et al., "Link-Based Classification," Proceedings of the Twentieth International Conference on Machine Learning (ICML), Aug. 2003, pp. 496-503, vol. 3.

X. He et al., "Laplacian Score for Feature Selection," Conference: Advances in Neural Information Processing Systems (NIPS), Dec. 2005, pp. 507-514, vol. 18, Vancouver, British Columbia, Canada.

G. Kollios et al., "Clustering Large Probabilistic Graphs," IEEE Transactions on Knowledge and Data Engineering, Feb. 2013, pp. 325-336, vol. 25, No. 2.

S.A. MacSkassy et al., "Classification in Networked Data: A Toolkit and a Univariate Case Study," Journal of Machine Learning Research, May 2007, pp. 935-983, vol. 8.

G.-J. Qi et al., "On Clustering Heterogeneous Social Media Objects with Outlier Links," Proceedings of the Fifth ACM International Conference on Web Search and Data Mining (WSDM), Feb. 2012, pp. 553-562.

J. Tang et al., "Feature Selection with Linked Data in Social Media," Proceedings of the Twelfth SIAM International Conference on Data Mining, Apr. 2012, pp. 118-128.

J. Tang et al., "Unsupervised Feature Selection for Linked Social Media Data," Proceedings of the 18th ACM SIGKDD International Conference on Knowledge Discovery and Data Mining, Aug. 2012, pp. 904-912, Beijing, China.

L. Wolf et al., "Feature Selection for Unsupervised and Supervised Inference: The Emergency of Sparsity in a Weight-Based Approach," The Journal of Machine Learning Research, Dec. 2005, pp. 1855-1887, vol. 6, No. 11.

Y. Yang et al., "A Comparative Study on Feature Selection in Text Categorization," Proceedings of the Fourteenth International Conference on Machine Learning (ICML), Jul. 1997, pp. 412-420.

Z. Zeng et al., "Out-of-Core Coherent Closed Quasi-Clique Mining from Large Dense Graph Databases," ACM Transactions on Database Systems (TODS), Jun. 2007, 40 pages, vol. 32, No. 2, Article 13.

Y. Zhou et al., "Graph Clustering Based on Structural/Attribute Similarities," Proceedings of the VLDB Endowment, Aug. 2009, pp. 718-729, vol. 2, No. 1, Lyon, France.

D. Zhou et al., "Learning from Labeled and Unlabeled Data on a Directed Graph," Proceedings of the 22nd International Conference on Machine Learning, 2005, pp. 1036-1043, Bonn, Germany.

* cited by examiner

LINK DE-NOISING IN A NETWORK

FIELD

The present application relates generally to data processing, and more particularly to link detection and de-noising in a network.

BACKGROUND

The rapid growth of online social, communication and academic networks has led to the creation of massive graphs containing a large number of edges, an edge being an interaction or connection (link) between two parties or events (nodes). For example, modern social networks and academic networks may contain millions to hundreds of millions of nodes and links. The links in these networks are often created through noisy processes. In such cases, not all links may be equally informative for the knowledge discovery process. Such links may often be harmful for making inferences in real network analysis scenarios.

The presence of noisy links is very common in a variety of real network analysis scenarios. For example, the vast majority of ties in social and information networks are weak ties, which do not add much information to the network representation. In a social network such as Facebook, the majority of friends on a social network may be relatively inactive links corresponding to distant acquaintances. Such links may not add much to the knowledge discovery process. As another example, many links in academic networks are caused by occasional interactions between unrelated researchers. In many cases, these occasional interactions do not represent true affinities or linkages between these researchers. In a further example, in many biological networks such as protein interaction networks, the links are inferred statistically. This is an inexact and noisy process.

Noisy links can be an impediment to many applications such as data mining or graph mining. For example, most of the methods for graph mining, such as community detection and classification are highly dependent on consistency in link structure in order to obtain accurate results. However, existing methods are still prone to a significant amount of noise, which is caused by the inconsistent links in the network.

SUMMARY

Embodiments of the invention provide techniques for detecting and annotating noise in a graph of a network.

For example, in one embodiment of the invention, a method comprises obtaining a graph representative of a given network, sampling the graph a given number of times to estimate a level of noisiness for one or more edges in the graph, and annotating the one or more edges of the graph with the respective level of noisiness.

In a further embodiment, an apparatus comprises a memory and a processor operatively coupled to the memory. The processor is configured to obtain a graph representative of a given network, sample the graph a predetermined number of times to estimate a level of noisiness for one or more edges in the graph, and annotate the one or more edges of the graph with the respective level of noisiness.

In another embodiment, an article of manufacture comprises a computer readable storage medium for storing computer readable program code. The computer readable program code, when executed, causes a computer to obtain a graph representative of a given network, sampling the graph a predetermined number of times to estimate a level of noisiness for one or more edges in the graph, and annotate the one or more edges of the graph with the respective level of noisiness.

Advantageously, illustrative embodiments of the invention address the problem of detecting noise and link de-noising in networks with the use of connectivity sampling. Illustrative embodiments of the invention further address the problem of link de-noising in networks with the use of uncertain or annotated graphs.

These and other objects, features and advantages of the present invention will become apparent from the following detailed description of illustrative embodiments thereof, which is to be read in connection with the accompanying drawings.

DETAILED DESCRIPTION

Figure 1A:
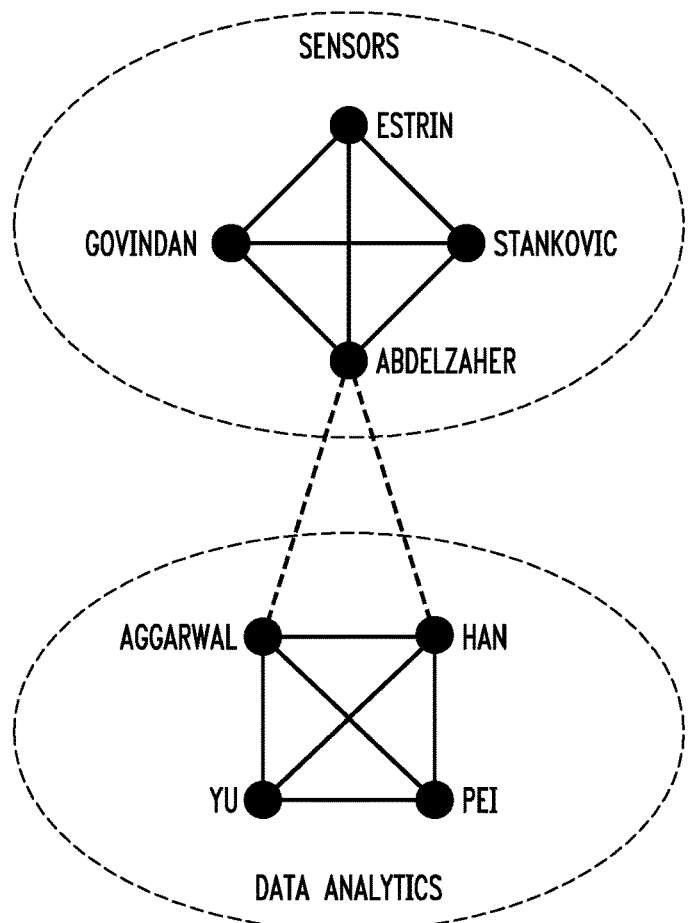
FIG. 1A depicts an illustrative example of how the community graph/structure is related to the noisiness of the underlying links.

Large information and social networks are extremely noisy with a large number of irrelevant, erroneous and/or inconsistent links. The presence of such noisy links is often an impediment to effective classification, clustering and application of network mining algorithms, because the links may not represent a coherent network connectivity structure. For example, FIG. 1 illustrates a portion of the Digital Bibliography and Library Project (DBLP) network, corresponding to a few members of the data analytics and sensor communities. The nodes within each of the networking and data mining communities are typically connected densely together. There are also a few connections between the two communities (shown by the dashed lines) because of occasional interactions between the two communities. However, such edges can often add noise to many network analysis algorithms. For example, in a community detection application, such edges may result in the mixing of the sensor and data mining communities. Similarly, in the case of a collective classification algorithm, such edges could result in the classification of a node labeled with data analytics as sensor/networking and vice-versa. The key point about the dashed edges is that they show little consistency with the connectivity structures of the sub-networks at their end points.

Therefore, illustrative embodiments of the invention provide an approach to detect such edges effectively, since such edges can cause challenges to mining algorithms. The challenge here is that in some cases, edges cannot be clearly considered either informative or non-informative. Accordingly, illustrative embodiments of the invention model the edges in terms of the probability of informativeness or relevance.

Illustrative embodiments of the invention provide for creating an uncertain representation of the underlying network, in which the probabilities of links are related to the probability of that node pair remaining connected in a down-sampled network. The core idea of connectivity sampling is that links which are consistent with one another in terms of network connectivity are more likely to be informative than those which are inconsistent with one another.

Illustrative embodiments of the invention further include design algorithms which use purely structural information for the de-noising process. This approach also depends upon an intuitive notion of connectivity sampling which attempts to measure the consistency of the links in terms of their connectivity behavior in the network. This leads to a problem-independent approach for estimation of link significance probabilities. This link significance probability is essentially a weight which measures the noisiness of each edge for network mining applications. The weight is used to create a probabilistic uncertain graph representation, which can improve the quality of any algorithm that is dependent upon the consistency in the network connectivity structure. Since most fundamental network mining algorithms, such as community detection and collective classification, are dependent upon such structural consistencies, the ability to capture an uncertain representation of such inconsistencies would be advantageous.

The probability of each edge can also be interpreted as a weight which indicates its importance. As most graph mining algorithms, such as clustering or classification, are designed to work with weighted edges, the representations created by illustrative embodiments of the invention can almost be immediately applied to such algorithms.

Given an undirected network $G=(N,A)$, with node set N and edge set A, the number of nodes in N are denoted by n, and the number of edges in A are denoted by m. The size of the network is typically very large in terms of the number of edges, and many of the edges may be noisy and somewhat irrelevant to the network analysis. Illustrative embodiments of the invention seek to annotate the edge set A with uncertainty probabilities, i.e., annotate each edge with a probability weight, which can be used for improving the network representation. The probability weight provides an intuitive measure of the quality of the nodes and links in the underlying network, and the noisy nodes or links can be removed from the graph if necessary or desired.

As illustrated by FIG. 1A, some of the anomalous links in the network are typically such that they are not consistent with the overall connectivity structure. For example, the two dashed links connecting the sensor community and the data analytics community are not representative of the overall connectivity behavior of the network. Therefore, a down-sampling process, in which a random subset of the edges in the network is removed, may change the connectivity structure fundamentally when such atypical edges are lost. When a link (i,j) in A is such that both its end points are located in a highly connected region of the network, a modest down-sampling of the network is unlikely to disconnect the end points of this edge, even when the edge is removed from the network because of the down-sampling process. Such densely-connected edges are therefore consistent with the connectivity structure of the network. On the other hand, the end points of sparsely connected regions are more likely to be disconnected because of down-sampling. For example, in FIG. 1A, the loss of the two dashed links in a down-sampling approach disconnects the two communities. Accordingly, the connectivity-consistency of an edge is defined in the context of a down-sampling algorithm in illustrative embodiments of the invention.

Figure 1B:
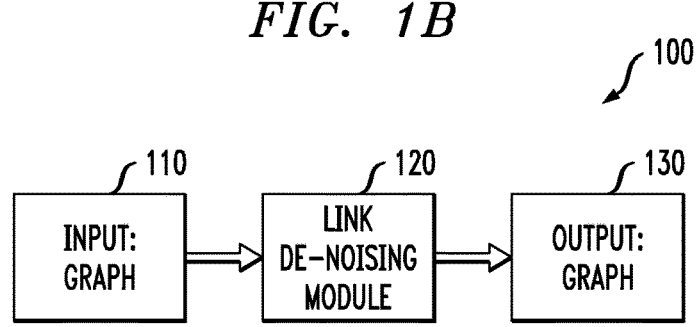
FIG. 1B depicts an overview of a link de-noising system according to an embodiment of the invention.

FIG. 1B depicts the overall system and procedure for detecting noise, annotating noise and link de-noising in a graph representative of a network according to an embodiment of the invention. At step 110 of system 100, a graph/structure is used as input. The graph/structure can come from various sources, for example, software can extract the graph/structure from the web to be used as input for illustrative embodiments of the invention. Then in step 120, the input graph is processed by a link de-noising module. Details of the link de-noising module are further described in the context of FIGS. 2 through 4 below. Finally, at step 130, the resulting graph is generated as the output.

Figure 2:
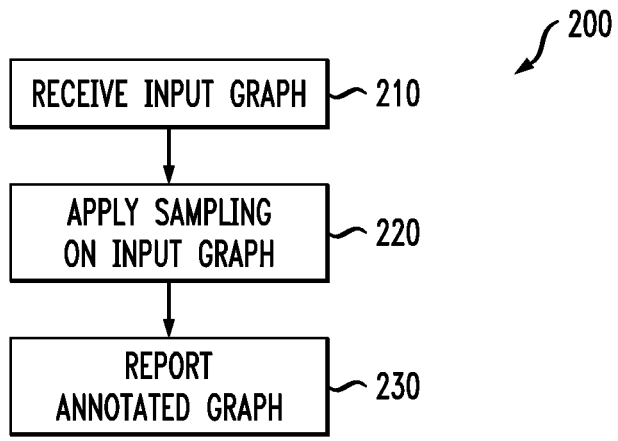
FIG. 2 depicts a link de-noising methodology according to an embodiment of the invention.

FIG. 2 is a flow chart depicting a methodology of the link de-noising module of FIG. 1B. Link de-noising methodology 200 starts at step 210, in which an input graph, such as that depicted in FIG. 1A, is used. At step 220, sampling is applied to the input graph. Details of the sampling step will be provided in the context of FIGS. 3 and 4. Then at step 230, an annotated graph is reported as the output.

With reference to step 220, in the context of the sampling process, the concept of f-connectivity consistency, denoted by $C(f,i,j)$ of an edge (i,j) at sampling level f, is defined as follows. The f-connectivity consistency $C(f,i,j)$ of an edge (i,j) in A in the network $G=(N,A)$ at sampling level f is defined as the probability that nodes i and j are connected in the network $G(f)=(N,A(f))$, where $A(f)$ is obtained from A by randomly sampling a fraction f of the edges in A.

The f-connectivity consistency of an edge is at least f. Not all levels of down-sampling are equally helpful in discerning between consistent and inconsistent edges. For large values of the sampling probability (i.e., when the value of f is high), most of the connected components stay connected. Since the probability of disconnection of any pair of components with r edges between the pair of components is exactly $1-(1-f)^r$, the use of high values of f provides little discriminative understanding between different edges. Therefore, if such consistency values are utilized in order to annotate the network with uncertainty probabilities, it will provide very little insights about the differences between the different edges in the original network. On the other hand, for lower values of f, it is possible to discern between different levels of connectivity. Furthermore, different values of f may provide different insights about discriminating between different kinds of edges. Therefore, in order to obtain the full level of discrimination between different edges, different levels of the sampling level f should be used.

By defining the random sampling parameter f to be drawn from a uniform distribution in $(0,\alpha)$, it is possible to compute the expected connectivity consistency over all lower levels of down-sampling of the network. The value of $\alpha$ defines the threshold, increasing beyond which does not add any information to the network. Therefore, the $\alpha$-expected connectivity consistency $EC(\alpha,i,j)$ (or alpha-probability for short) of edge (i,j) is defined as follows.

The $\alpha$-expected connectivity consistency $EC(\alpha,i,j)$ (or $\alpha$-probability) of an edge $(i,j) \in A$ is defined as the expected value of the f-connectivity consistency, when f is chosen uniformly at random from $(0,\alpha)$. Intuitively speaking, the value of $\alpha$ should be picked on the basis of a-priori knowledge about the noise in the network. Choosing low values of $\alpha$ is more appropriate for noisy networks such as in social media, where many links are not informative. What this value really tries to find is the level of connectivity between i and j beyond the direct edge between i and j. In the absence of any other connectivity, the value of $\alpha$ (or rather $\alpha/2$) denotes the a-priori estimation of the probability that the two components will become disconnected by down-sampling.

Illustrative embodiments of the invention will be described below in terms of a simple sampling algorithm and a sorted sampling algorithm. However, it is to be appreciated that other sampling algorithms can also be used in alternative embodiments of the invention.

Figure 3:
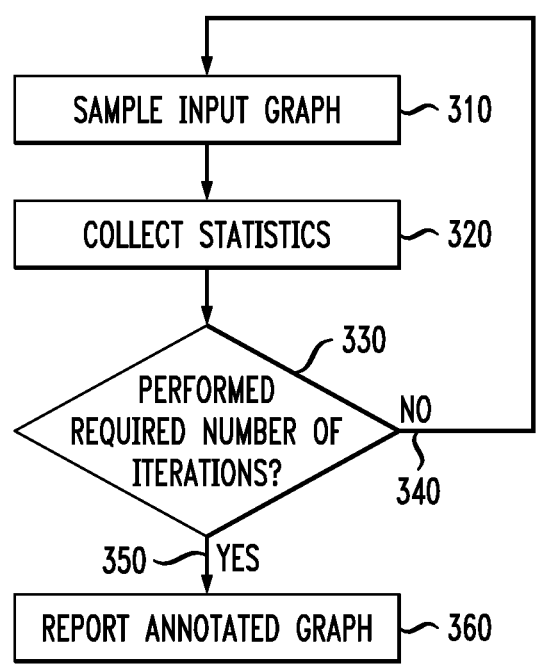
FIG. 3 depicts a simple sampling procedure, used in the sampling step of FIG. 2, for creating the de-noised representation of the input graph.

With reference to FIG. 3, which depicts one illustrative embodiment of step 220 of FIG. 2, the $\alpha$-probability, EC($\alpha$, i,j), can be estimated with the use of a simple sampling algorithm. At step 310, the input graph is sampled. A sampling parameter $\eta$, which can be randomly generated or pre-defined by a user, is used to determine the total number of samples. In each iteration, a random parameter f in $(0,\alpha)$ is generated, and each edge is sampled independently with probability f. At step 320, resulting statistics are collected for each iteration. Specifically, the statistics collected are the fraction of iterations in which each pair of nodes with an edge between them becomes disconnected. For each pair of nodes for which an edge exists between them, this information is collected and aggregated with the statistics from the previous iterations. Then at step 330, the algorithm checks whether or not the desired/required number of iterations, $\eta$, has been performed. If not, then at step 340, the algorithm returns to step 310. This process is repeated for $\eta$ iterations. At step 350, at the end of the process when all desired/required iterations have been performed, for each edge (i,j), the fraction of the $\eta$ samples in which the node pair i and j remains connected after down-sampling is determined. This is reported as the final estimate of the $\alpha$-probability. At step 360, the edges are annotated with their respective probability weights, and the annotated graph is reported as the output.

Figure 4:
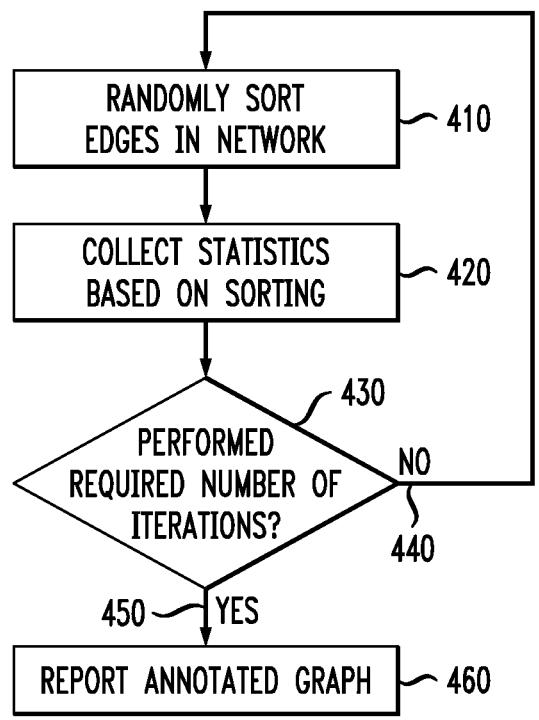
FIG. 4 depicts a sorted sampling procedure, used in the sampling step of FIG. 2, for creating the de-noised representation of the input graph.

With reference to FIG. 4, which depicts an alternative embodiment of step 220 of FIG. 2, an algorithm that uses sorting in order to improve the efficiency of the approach can be implemented. At step 410, the edges of the input graph are randomly sorted. The edges can be all or a subset of the edges of the input graph. The algorithm then proceeds by successively adding edges to the subgraph represented by set S. While the edges are being added, the fraction of edges which have been added to S so far is tracked and denoted by f'. Note that the addition of an edge (i,j) to S may result in some other pair of nodes k and l becoming connected, even though edge (k,l) exists in A, and has not yet been added to S. Then, the expected $\alpha$-probability of the edge (k,l) based on the current random sort sample is $\alpha-f'$ over all possible sample sizes f in $(0,\alpha)$. Once the edges are randomly sorted, the algorithm proceeds to determining the fraction of edges which need to be picked in order to determine whether the end points of the edge are connected. The resulting statistics are collected at step 420. More specifically, the average value of the fraction over multiple sorts is determined, which provides an estimate of the fraction of the time in which the end points become disconnected. Then at step 430, the algorithm checks if all desired/required iterations, $\eta$, have been performed. Again, $\eta$ can be a randomly generated number or a pre-defined number. If the required number of iterations have not been performed, then at step 440, the algorithm returns to step 410. Each iteration in this case is slightly more computationally expensive, because every time an edge (i,j) is added to S, all other edges (k,l) in A which become connected as a result of the addition of edge (i,j) need to be determined. This process requires m·log(n) time over the course of an entire sampling iteration. Since the sorting process also requires at most m·log(m)=m·log(n) time, it follows that each iteration requires this amount of time. While each iteration is slightly more computationally expensive in this case, it does provide more information about the connectivity consistency in each sample.

Furthermore, during each iteration, whenever an edge (i,j) is added to S, the first step is to check whether i and j already belong to the same component in S (before addition of (i,j) to S). That is, if i and j already belong to the same component in S, there is no change in connectivity of any of the edges in the network. In fact, the $\alpha$-probability of the edge (i,j) itself (in this iteration) was estimated earlier when the nodes i and j became connected. Since the addition of such an edge does not change the connectivity of the network, the iteration-specific $\alpha$-probability of none of the edges are updated in this iteration. On the other hand, when nodes i and j do not belong to the same component, the end points of some of the edges (k,l) not yet added to S may become connected in S, if the components corresponding to k and l become connected. In that case, the edges adjacent to the smaller of the two components are scanned, and it is determined if the end point lies in the other component (before the addition of (i,j)). By scanning all the adjacency links of the smaller of the two components, it is possible to determine all the relevant node pairs which became connected in this iteration. The iteration-specific value of the $\alpha$-probability of such edges is set to $\alpha-f'$.

At the end of the process at step 450, when all the iterations have been performed, the edges are annotated with their respective probability weights and the annotated graph is reported via a user interface as the output at step 460. As part of the user interface, a feature can be provided for the user to de-noise the graph, i.e., to remove noisy links based on the results of the annotated graph. For example, a user can select specific links for removal (i.e., manual removal), or specify a threshold below which the links are considered noisy (i.e., automatic removal). Other suitable methods of link removal known in the art can also be used. In an illustrative example, in the case of a Facebook graph, the input graph is the social graph of friendships, whereas the output graph is a social graph in which all the edges have been annotated with probabilities (e.g., occasional acquaintances will typically have low probabilities, whereas tightly knit friends will have high probabilities). Based on the annotated graph, some or all of the edges with low probabilities can be selected for removal from the graph. As each edge represents a link between two nodes, in the example above, removal of an edge with low probability may represent removal of the link with an occasional acquaintance. The output graph can then be used for data mining purposes.

Figure 5:
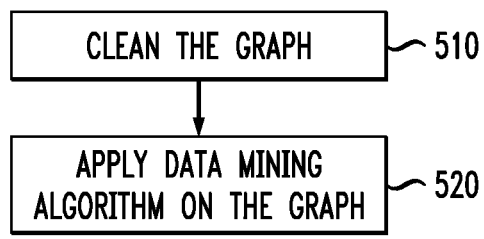
FIG. 5 depicts a use of the de-noising methodology in the context of a data mining algorithm according to an embodiment of the invention.

FIG. 5 is general depiction of how the de-noised data may be used in the context of a data mining algorithm. The first phase in step 510 is to clean the graph. Cleaning or de-noising the graph can be done using one or more of the methodologies as described above with respect to FIGS. 2 through 4. Then at step 520, this de-noised graph can be used in the context of a data mining algorithm. For example, in the case of the annotated Facebook graph, the de-noised graph in which some or all of the links with occasional acquaintances have been removed can be used for data mining purposes to provide more informative results.

Illustrative embodiments of the present invention may be a system, a method, and/or a computer program product. The computer program product may include a computer readable storage medium (or media) having computer readable program instructions thereon for causing a processor to carry out aspects of the present invention.

Figure 6:
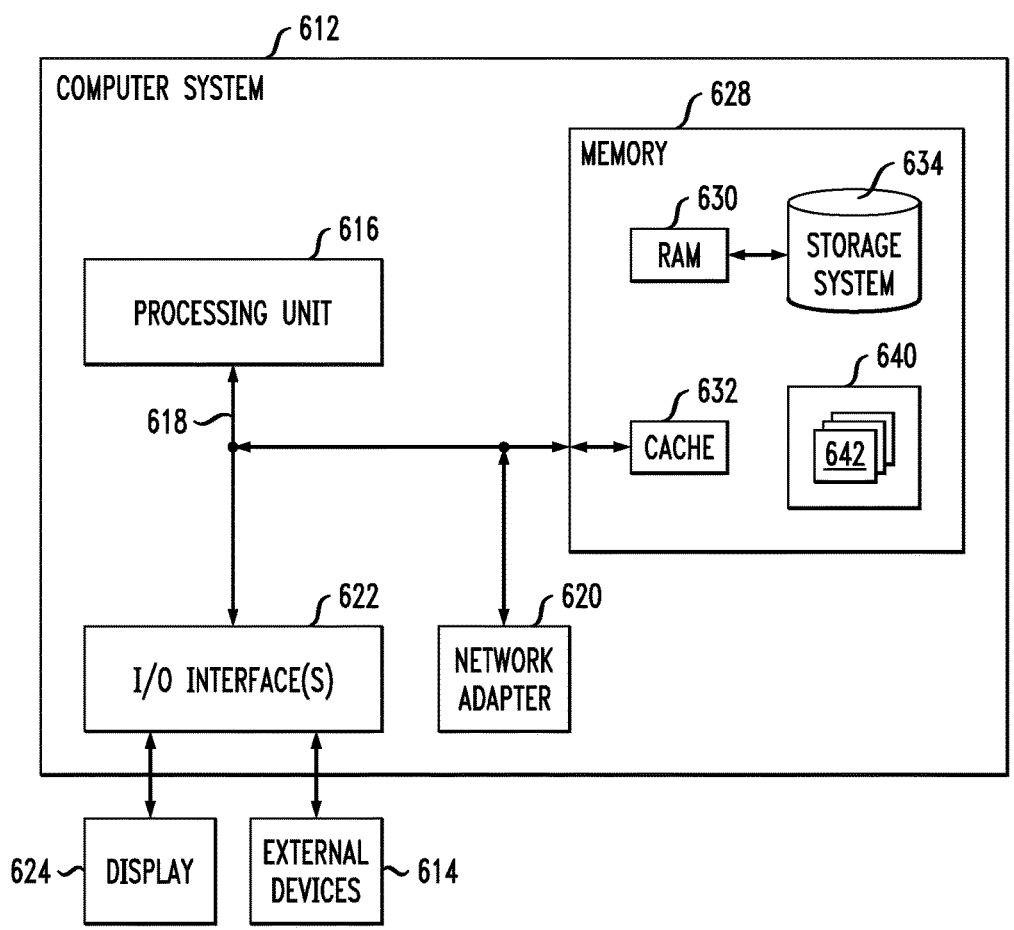
FIG. 6 depicts a computer system in accordance with which one or more components/steps of techniques of the invention may be implemented according to an embodiment of the invention.

Accordingly, the architecture shown in FIG. 6 may be used to implement the various components/steps shown and described above in the context of FIGS. 1B through 5.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples include, but are not limited to, microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A computer-implemented method, comprising the steps of:
   generating, via a processor device of a computer system, a graph representative of a given network in the system for real-time network connectivity analysis, wherein the graph includes a plurality of nodes and one or more edges connecting a pair of nodes in the given network;
   sampling, via the processor device, the graph a given number of iterations to estimate a probability of a level of noisiness for the one or more edges in the graph, wherein the sampling further comprises:
      collecting statistics for each sampling iteration;
      based on the collected statistics for the given number of iterations, estimating a fraction of the one or more edges that would remain connected or be disconnected during a de-noising step; and
      using the estimated fraction to represent the probability of the level of noisiness of the one or more edges;
      further wherein an expected connectivity consistency measure based on a randomly-selected parameter is used to discern between consistent and inconsistent edges over different sampling levels during the sampling step;
   annotating, via the processor device, the one or more edges of the graph with respective probability weights of the respective level of noisiness and providing an annotated graph using a user interface coupled to the processor device;
   de-noising the graph, via the user interface, based on the annotated graph, wherein de-noising comprises removing the one or more edges from the graph based on the level of noisiness; and applying a mining algorithm, via the processor device, to the de-noised graph,
wherein the processor device is coupled to a memory and is configured to execute program code to perform the above steps.

2. The method of claim 1, wherein a given fraction of the edges in the graph are sampled.

3. The method of claim 1, wherein the given number of times that the graph is sampled is a randomly generated number.

4. The method of claim 1, wherein sampling is performed using a simple sampling process.

5. The method of claim 1, wherein sampling is performed using a sorted sampling process.

6. The method of claim 4, wherein each edge is sampled independently with a given probability.

7. The method of claim 6, wherein the given probability is randomly generated for each iteration.

8. The method of claim 5, wherein the edges are sorted and added to the graph one at a time in a given order.

9. The method of claim 8, further comprising calculating an average probability, of disconnection over multiple sorts for the one or more nodes.

10. The method of claim 1, further comprising displaying the annotated graph to a user.

11. An apparatus comprising:
a memory; and a processor operatively coupled to the memory via a communication network and configured to:
generate a graph representative of a given network in a system for real-time network connectivity analysis, wherein the graph includes a plurality of nodes and one or more edges connecting a pair of nodes in the given network;
sample the graph a given number of iterations to estimate a probability of a level of noisiness for the one or more edges in the graph, wherein the sampling further comprises:
collecting statistics for each sampling iteration; based on the collected statistics for the given number of iterations, estimating a fraction of the one or more edges that would remain connected or be disconnected during a de-noising step; and
using the estimated fraction to represent the probability of the level of noisiness of the one or more edges;
further wherein an expected connectivity consistency measure based on a randomly-selected parameter is used to discern between consistent and inconsistent edges over different sampling levels during the sampling step;
annotate the one or more edges of the graph with respective probability weights of the respective level of noisiness and provide an annotated graph using a user interface coupled to the processor;
de-noise the graph based on the annotated graph using the user interface wherein de-noising comprises removing the one or more edges from the graph based on the level of noisiness, and apply a mining algorithm to the de-noised graph.

12. The apparatus of claim 11, wherein a given fraction of the edges in the graph are sampled.

13. The method of claim 11, wherein sampling is performed using a simple sampling process.

14. The method of claim 11, wherein sampling is performed using a sorted sampling process.

15. An article of manufacture comprising a non-transitory computer readable storage medium for storing computer readable program code which, when executed, causes a computer to:
generate a graph representative of a given network in a system for real-time network connectivity analysis, wherein the graph includes a plurality of nodes and one or more edges connecting a pair of nodes in the given network using a processor device;
sample the graph a given number of iterations to estimate a probability of a level of noisiness for the one or more edges in the graph, wherein the sampling further comprises:
collecting statistics for each sampling iteration;
based on the collected statistics for the given number of iterations, estimating a fraction of the one or more edges that would remain connected or be disconnected during a de-noising step; and
using the estimated fraction to represent the probability of the level of noisiness of the one or more edges;
further wherein an expected connectivity consistency measure based on a randomly-selected parameter is used to discern between consistent and inconsistent edges over different sampling levels during the sampling step;
annotate the one or more edges of the graph with respective probability weights of the respective level of noisiness and provide an annotated graph using a user interface coupled to the processor device;
de-noise the graph based on the annotated graph using the user interface, wherein de-noising comprises removing the one or more edges from the graph based on the level of noisiness and apply a mining algorithm to the de-noised graph.

16. The article of manufacture of claim 15, wherein a given fraction of the edges in the graph are sampled.

17. The article of manufacture of claim 15, wherein the given number of times that the graph is sampled is a randomly generated number.

18. The article of manufacture of claim 15, wherein sampling is performed using a simple sampling process.

19. The article of manufacture of claim 15, wherein sampling is performed using a sorted sampling process.

20. The article of manufacture of claim 19, wherein each edge is sampled independently with a given probability.

* * * * *